United States Patent
Caution et al.

(10) Patent No.: US 10,489,269 B2
(45) Date of Patent: Nov. 26, 2019

(54) SYSTEMS, DEVICES, AND METHODS FOR GENERATING TERMINAL RESOURCE RECOMMENDATIONS

(71) Applicant: Walmart Apollo, LLC, Bentonville, AR (US)

(72) Inventors: Stephen Tyler Caution, Bentonville, AR (US); Tricia Mcpherson Hicks, Bentonville, AR (US); Lori Lee Wise, Rogers, AR (US); Douglas Jahe Ryner, Rogers, AR (US); Joshua David Osmon, Bentonville, AR (US); Jaclyn Moreda, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 159 days.

(21) Appl. No.: 15/653,580

(22) Filed: Jul. 19, 2017

(65) Prior Publication Data
US 2018/0024907 A1    Jan. 25, 2018

Related U.S. Application Data

(60) Provisional application No. 62/365,645, filed on Jul. 22, 2016.

(51) Int. Cl.
*G06F 11/34*    (2006.01)
*H04L 12/24*    (2006.01)

(52) U.S. Cl.
CPC ...... *G06F 11/3495* (2013.01); *H04L 41/0213* (2013.01); *H04L 41/0883* (2013.01); *H04L 41/147* (2013.01)

(58) Field of Classification Search
None
See application file for complete search history.

(56) References Cited

U.S. PATENT DOCUMENTS

| | | | |
|---|---|---|---|
| 9,280,777 B2 * | 3/2016 | Bilicki | G06Q 10/06 |
| 9,667,498 B2 * | 5/2017 | Wu | H04L 41/0896 |
| 2006/0095317 A1 | 5/2006 | Brown et al. | |
| 2012/0089902 A1 | 4/2012 | Sheflin | |
| 2014/0236653 A1 | 8/2014 | Farrell | |
| 2015/0208043 A1 | 7/2015 | Lee et al. | |
| 2015/0269642 A1 | 9/2015 | Cai et al. | |

FOREIGN PATENT DOCUMENTS

WO    2008/154003 A2    12/2008

OTHER PUBLICATIONS

Nomi Service Datasheet [online]. www.nomi.com [retrieved 2016]. Retrieved from the internet: <URL: https://www.nomi.com>.

* cited by examiner

*Primary Examiner* — Cai Y Chen
(74) *Attorney, Agent, or Firm* — McCarter & English, LLP; David R. Burns

(57) ABSTRACT

A technique for generating terminal resource recommendations is discussed. Terminal activity status data is retrieved from a number of sensors in order to generate and render terminal resource recommendations. The activity status data is used to calculate a current active terminal recommendation indicative of the number of terminals needed to currently satisfy a particular service metric. A predicted active terminal recommendation indicative of the number of terminals needed at a specified future time period in order to satisfy a particular service metric at the specified future time period may also be generated.

20 Claims, 6 Drawing Sheets

SYSTEMS, DEVICES, AND METHODS FOR GENERATING TERMINAL RESOURCE RECOMMENDATIONS

RELATED APPLICATIONS

This application claims priority to U.S. Provisional Patent Application Ser. No. 62/365,645 entitled "SYSTEMS, DEVICES, AND METHODS FOR GENERATING TERMINAL RESOURCE RECOMMENDATIONS," filed on Jul. 22, 2016, the contents of which is hereby incorporated by reference in its entirety.

BACKGROUND OF THE TECHNOLOGY

Computing terminals can be used to perform various functions, and the workload of each terminal can be determined using various techniques. In some instances, the workload of each terminal can be monitored in order to achieve a desired efficiency level or service metric.

SUMMARY

Embodiments of the present invention utilize terminal activity status data retrieved from a number of sensors in order to generate and render terminal resource recommendations. For example, embodiments may monitor terminal activity, using a variety of sensors, to calculate a current active terminal recommendation indicative of the number of terminals needed to currently satisfy a particular service metric. Embodiments may also calculate a predicted active terminal recommendation indicative of the number of terminals needed at a specified future time period in order to satisfy a particular service metric at the specified future time period.

In one embodiment, a system for generating terminal resource recommendations includes sensors configured to identify an activity status of each one of a group of terminals. The system also includes a processor in communication with the sensors and configured to retrieve activity status data for terminals that are currently active. The processor is also configured to execute a service metric retrieval module to retrieve a service metric representative of a desired workload for each of the currently active terminals. The processor is also configured to execute a terminal recommendation module to calculate a current active terminal recommendation representative of a number of terminals that should be currently active in order to satisfy the retrieved service metric. The terminal recommendation module is also configured to calculate a predicted active terminal recommendation, based on an amount of customer traffic, representative of a number of terminals that should be active at a specified future time period in order to maintain the retrieved service metric at the specified future time period.

In another embodiment, a method for generating terminal resource recommendations is disclosed. The method includes identifying, using a plurality of sensors, an activity status of each of a plurality of terminals. The method also includes retrieving, via a processor in communication with the plurality of sensors, activity status data representative of a number of terminals currently active. The method also includes retrieving, via a service metric retrieval module, a service metric representative of a desired workload for each of the terminals currently active. The method also includes calculating, via a terminal recommendation module, a current active terminal recommendation representative of a number of terminals of the plurality of terminals that should be currently active in order to satisfy the retrieved service metric. The method also includes calculating, via a terminal recommendation module, a predicted active terminal recommendation, based on an amount of customer traffic, representative of a number of terminals of the plurality of terminals that should be active at a specified future time period in order to maintain the retrieved service metric at the specified future time period.

Additional combinations and/or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
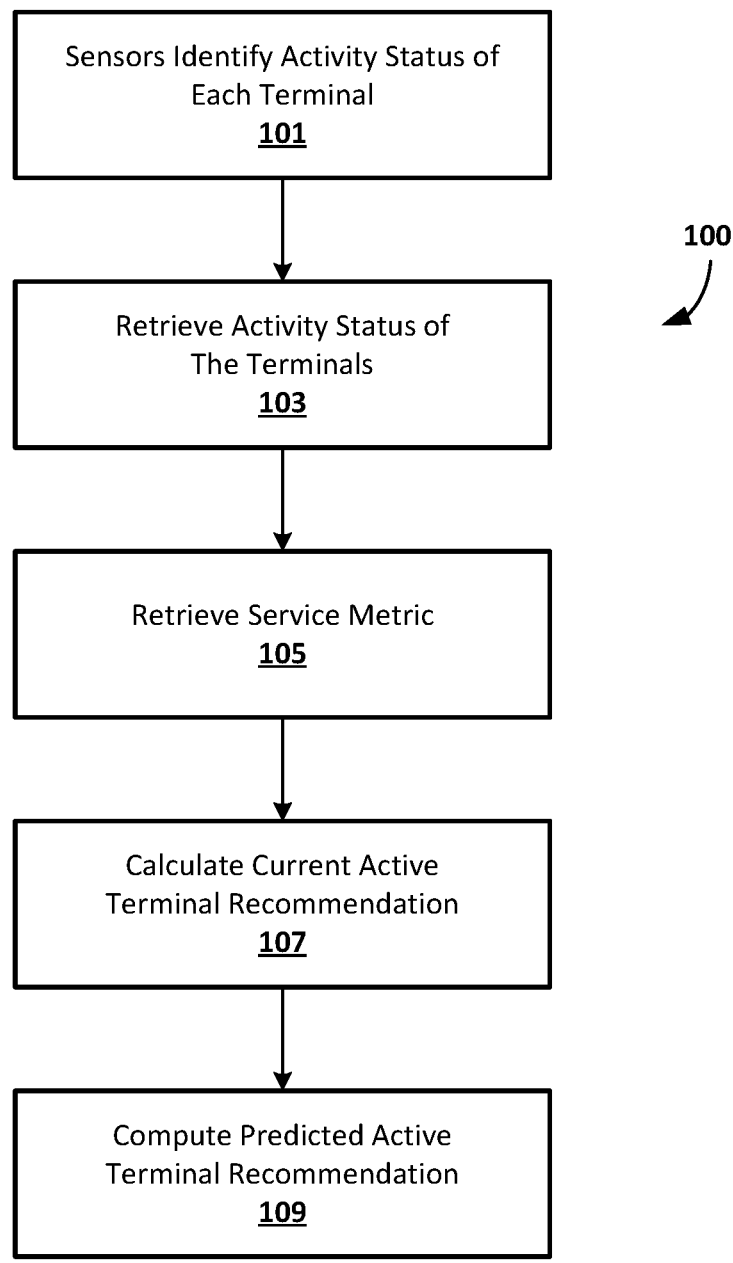
FIG. 1 is a flowchart illustrating an exemplary method of generating terminal resource recommendations, in accordance with an exemplary embodiment of the present disclosure.

Following below are more detailed descriptions of various concepts related to, and embodiments of, inventive methods, apparatus, and systems for generating terminal resource recommendations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means "includes but is not limited to", the term "including" means "including but not limited to". The term "based on" means "based at least in part on".

In accordance with some embodiments of the present invention, methodologies, systems, apparatus, and non-transitory computer-readable media are described herein to facilitate generating terminal resource recommendations. In exemplary embodiments, sensors may be placed at or near a number of terminals, and these sensors can monitor the activity status of each terminal. The sensors can include, for example, cameras, motion detectors, pressure sensors, or other sensors capable of determining the presence and number of persons interacting with each terminal or waiting in a queue to interact, directly or indirectly, with each of the terminals. In some embodiments, each terminal can be configured to interact with a user and perform a specific task. The number of terminals currently active, and the workload corresponding to each active terminal, can be adjusted in response to increases or decreases in terminal user traffic. The sensors can detect whether or not each terminal is active, the number of users waiting in line to interact with each active terminal, the location of each currently active terminal, the amount of time each active terminal has been active, the amount of time each idle terminal has been idle, and other terminal activity data.

A processor can be in communication with the sensors and can retrieve terminal activity data from the sensors. For example, as explained further below, the processor may be located in a server that is in wired or wireless communication with the sensors. The processor can also retrieve a service metric representative of a desired workload for each of the currently active terminals. In a non-limiting example embodiment, the terminals can include point of sale terminals within an enterprise, such as a retail facility, and the retrieved service metric can correspond to the workload for each point of sale terminal that results in a desired customer experience. For example, the service metric may correspond to a situation where each customer within the enterprise is able to interact with a point of sale terminal without having to wait in line behind more than one other customer. In such an example, if a customer has to wait in line behind two other customers in order to check out at a point of sale terminal, the desired service metric is not satisfied. In contrast, a customer not waiting or waiting only behind one customer may be considered to satisfy the service metric. In some embodiments, the service metric can change based on various factors, and the number of terminals needed in order to meet the retrieved service metric can vary based on time of day, changes in customer traffic, etc.

In one embodiment, the processor executes a terminal recommendation module to calculate a current active terminal recommendation that is representative of the number of terminals that should be currently active in order to satisfy the retrieved service metric. The terminal calculation module also calculates a predicted active terminal recommendation representative of the number of terminals that should be active at a specified future time period in order to maintain the retrieved service metric at that specified future time period. In some embodiments, the processor may execute an alert module to trigger an alerting mechanism, such as an email system, text messaging system, or other notification system, to notify a particular person if the retrieved service metric is not being met for a prolonged period of time, if one or more of the active terminals are falling significantly behind the retrieved service metric. For example, if one particular terminal is not meeting the retrieved service metric for a prolonged period of time, while all the other terminals are meeting the service metric, a text or email message may be sent to a technical support specialist in order to check whether there is a technical problem with that particular terminal. In another example, if all of the terminals are performing below the retrieved service metric, a text or email message may be sent to a manager in charge of the terminals prompting the manager to assess the workload of the terminals.

In some embodiments, a display device can render a graphical representation of each currently active terminal via a GUI. The GUI can also render a timestamp indicative of when the current active terminal recommendation and/or when the predicted active terminal recommendation was calculated.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an method 100 for generating terminal resource recommendations, in accordance with an exemplary embodiment. It will be appreciated that the method is programmatically performed by one or more computer-executable processes executing on, or in communication with, one or more servers described further below. In step 101, a number of sensors identify an activity status of each of a group of terminals. The sensors can include, for example, cameras, motion detectors, pressure sensors, or other sensors capable of determining the presence and number of persons interacting with each terminal or waiting in a queue to interact, directly or indirectly, with the terminal. In some embodiments, each terminal can be configured to interact with a user and perform a specific task. The ideal number of terminals that should be active may change depending on how many users need access to a terminal at any given time. In some embodiments, the sensors can generate activity status data corresponding to each of the terminals that indicates whether or not each terminal is active. In some embodiments, the sensors can also detect a number of users waiting to interact with each terminal, which can be indicative of the workload corresponding to each terminal. The activity status data can include, for example, the number of currently active terminals, the location of currently active terminals, the number of users in queue to use each currently active terminal, the amount of time each active terminal has been active, the amount of time each idle terminal has been idle, etc.

In step 103, a processor in communication with the sensors executes instructions to retrieve the activity status data for each of the terminals. The number of currently active terminals and associated activity information is used to determine an allocation of current and future terminal resources by embodiments of the present invention.

In step 105, a service metric retrieval module executed by the processor retrieves a service metric representative of a desired workload for each of the currently active terminals. In a non-limiting example, the terminals can include point of sale terminals within an enterprise, and the service metric can correspond to a workload for each point of sale terminal that is expected to result in a desired customer experience. For example, the service metric may correspond to a situation where each customer within an enterprise is able to interact with a point of sale terminal without having to wait in line behind more than one other customer. In such an example, if a customer has to wait in line behind two other customers in order to check out at a point of sale terminal, the desired service metric is not satisfied.

In step 107, a terminal recommendation module executed by the processor calculates a current active terminal recommendation. The current active terminal recommendation is representative of the number of terminals that should be currently active in order to satisfy the retrieved service metric. In the example described above in which the terminals are point of sale terminals within an enterprise, and if each of nine terminals are performing according to the retrieved service metric, the current active terminal recommendation would be nine. If, however, two of the active terminals are not meeting the retrieved service metric, and the terminal recommendation module determines that two additional active terminals are needed in order to meet the service metric, the current active terminal recommendation would be eleven. In one embodiment, the current active terminal recommendation may be formed by first examining the total number of customers in line, the total number of customers in the facility or a combination thereof and analyzing the number with respect to the total number of active and/or available terminals.

In step 109, the terminal recommendation module calculates a predicted active terminal recommendation. The predicted active terminal recommendation is based on an amount of customer traffic, and is representative of the number of terminals that should be active at a specified future time period in order to maintain the retrieved service metric at that specified future time period. In some embodiments, the amount of customer traffic can be determined based on data from sensors positioned at an entrance to a facility or within a facility that indicate how many people will need to interact with a terminal in the near future. In a non-limiting example, the terminals can include point of sale terminals within an enterprise, and cameras or motion detectors located at an entrance to the enterprise can detect how many people are currently within the enterprise. In such an example, if a large number of customers is detected entering the enterprise, the terminal recommendation module can predict that a larger number of terminals needs to be active within the next 15-30 minutes in order to maintain the retrieved service metric in response to the increase in customer traffic. In other embodiments, the value of customer traffic can be determined based on historical terminal activity data. For example, if terminal workload typically increases at a particular time each day, the terminal recommendation module can predict that an increased number of terminals needs to be active at that particular time in order to maintain the retrieved service metric.

In one exemplary embodiment, the current active terminal recommendation and predicted active terminal recommendation can be calculated according to the data set described in Table 1, below.

TABLE 1

| | Current number of | Predicted number of customers | Estimated checkout | Target |
|---|---|---|---|---|

TABLE 1-continued

| | customers waiting | waiting in 15 min. | time per customer | service metric |
|---|---|---|---|---|
| Terminal A | 4 | 7 | 2 min. | 3 |
| Terminal B | 3 | 5 | 2 min. | 3 |
| Terminal C | 5 | 8 | 2 min. | 3 |
| Current Active Terminal Recommendation: | | | Open 1 additional terminal now | |
| Predicted Active Terminal Recommendation: | | | Open 4 additional terminals in 15 minutes | |

According to the example data set shown in Table 1, terminals A, B, and C are currently active and the various sensors at each point of sale terminal compute the number of customers waiting in each line. As discussed above, the sensors at the point of sale terminals can determine the number of customers waiting at each line using pressure sensors in the floor, cameras, motion sensors, etc. In this example data set, currently there are 4 customers waiting at terminal A, there are 3 customers waiting at terminal B, and there are 5 customers waiting at terminal C. The system can also include a number of sensors distributed throughout the store that can detect a flow of customers and predict an increase or decrease in customers at a future time. In one example embodiment, the sensors distributed throughout the store and at the entrance of the store can determine that a 20% increase in customers entering the store has occurred. The system can retrieve data relating to average shopping times and determine that the number of customers waiting in line at the checkout terminals will increase by 20% after a particular amount of time.

Figure 2:
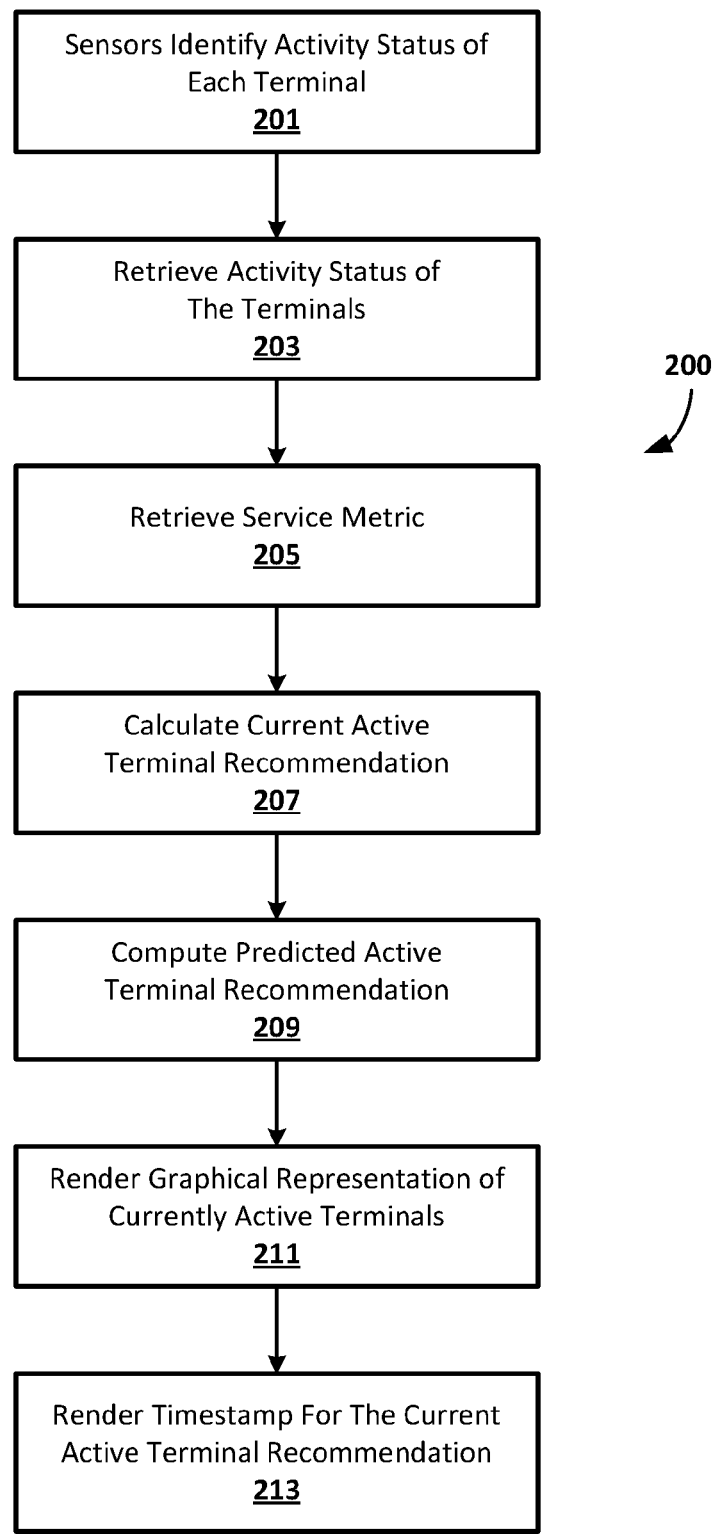
FIG. 2 is a flowchart illustrating another exemplary method for generating terminal resource recommendations, in accordance with an exemplary embodiment of the present disclosure.

FIG. 2 is a flowchart illustrating another exemplary method 200 for generating terminal resource recommendations, in accordance with an exemplary embodiment. It will be appreciated that the method is programmatically performed by one or more computer-executable processes executing on, or in communication with, one or more servers described further below. In step 201, a number of sensors identify an activity status of each of a group of terminals. The sensors can include, for example, cameras, motion detectors, pressure sensors, or other sensors capable of determining the presence and number of persons interacting with each terminal or waiting in a queue to interact, directly or indirectly, with the terminal. In some embodiments, each terminal can be configured to interact with a user and perform a specific task. The ideal number of terminals that should be active may change depending on how many users need access to a terminal at any given time. In some embodiments, the sensors can generate activity status data corresponding to each of the terminals that indicates whether or not each terminal is active. In some embodiments, the sensors can also detect a number of users waiting to interact with each terminal, which can be indicative of the workload corresponding to each terminal. The activity status data can include, for example, the number of currently active terminals, the location of currently active terminals, the number of users in queue to use each currently active terminal, the amount of time each active terminal has been active, the amount of time each idle terminal has been idle, etc.

In step 203, a processor in communication with the sensors executes instructions to retrieve activity status data for each of the terminals. The number of currently active terminals and associated activity information is used to determine an allocation of current and future terminal resources by embodiments of the present invention.

In step 205, a service metric retrieval module executed by the processor retrieves a service metric representative of a desired workload for each of the currently active terminals. In a non-limiting example, the terminals can include point of sale terminals within an enterprise, and the service metric can correspond to a workload for each point of sale terminal that results in a desired customer experience. For example, the service metric may correspond to a situation where each customer within an enterprise is able to interact with a point of sale terminal without having to wait in line behind more than one other customer. In such an example, if a customer has to wait in line behind two other customers in order to check out at a point of sale terminal, the desired service metric is not satisfied.

In step 207, a terminal recommendation module executed by the processor calculates a current active terminal recommendation. The current active terminal recommendation is representative of the number of terminals that should be currently active in order to satisfy the retrieved service metric. In the example described above in which the terminals are point of sale terminals within an enterprise, and if each of nine terminals are performing according to the retrieved service metric, the current active terminal recommendation would be nine. If, however, two of the active terminals are not meeting the retrieved service metric, and the terminal recommendation module determines that two additional active terminals are needed in order to meet the service metric, the current active terminal recommendation would be eleven.

In step 209, the terminal recommendation module calculates a predicted active terminal recommendation. The predicted active terminal recommendation is based on an amount of customer traffic, and is representative of the number of terminals that should be active at a specified future time period in order to maintain the retrieved service metric at that specified future time period. In some embodiments, the amount of customer traffic can be determined based on data from sensors positioned at an entrance to a facility or within a facility that indicates how many people will need to interact with a terminal in the near future. As an non-limiting example, the amount of customers in the facility may be compared with the number of customers already in line to determine a potential increase of customer traffic at the terminals. In a non-limiting example, the terminals can include point of sale terminals within an enterprise, and cameras or motion detectors located at an entrance to the enterprise can detect how many people are currently within the enterprise. In such an example, if a large number of customers is detected entering the enterprise, the terminal recommendation module can predict that a larger number of terminals needs to be active within the next 15-30 minutes in order to maintain the retrieved service metric in response to the increase in customer traffic. In other embodiments, the value of customer traffic can be determined based on historical terminal activity data. For example, if terminal workload typically increases at a particular time each day, the terminal recommendation module can predict that an increased number of terminals needs to be active at that particular time in order to maintain the retrieved service metric.

In step 211, a display renders a graphical representation of each currently active terminal via a GUI. In some embodiments, the graphical user interface can be used to help monitor the active terminals and allocate terminal resources. For example, the display may be rendered on a tablet or other portable computing device being operated by a store manager. The graphical representation of each currently active terminal can include, for example, a number corresponding to each active terminal. In other embodiments, the display can render a graphical representation of each of the plurality of terminals, wherein each of the currently active terminals is a particular and different color from the inactive terminals. In other embodiments, the graphical representation of each currently active terminal includes a visual indication, such as a color indicator, of whether that terminal is satisfying the retrieved service metric. For example, the graphical representation of each currently active terminal that is meeting the retrieved service metric can be highlighted in green, while the graphical representation of each currently active terminal that is not meeting the retrieved service metric can be highlighted in red.

In step 213, the display renders, via the GUI, a timestamp indicative of when the current active terminal recommendation was calculated. In some embodiments, the current active terminal recommendation is calculated on a periodic basis, such as every 1-5 minutes. In such embodiments, a time stamp can be rendered so that a person viewing the GUI can know when the current active terminal recommendation was last calculated. If the system were to freeze or stop working, the time stamp can alert a user that the current active terminal recommendation is not being properly updated and the offset between the displayed timestamp and the actual time will alert a system user to a possible problem.

Figure 3:
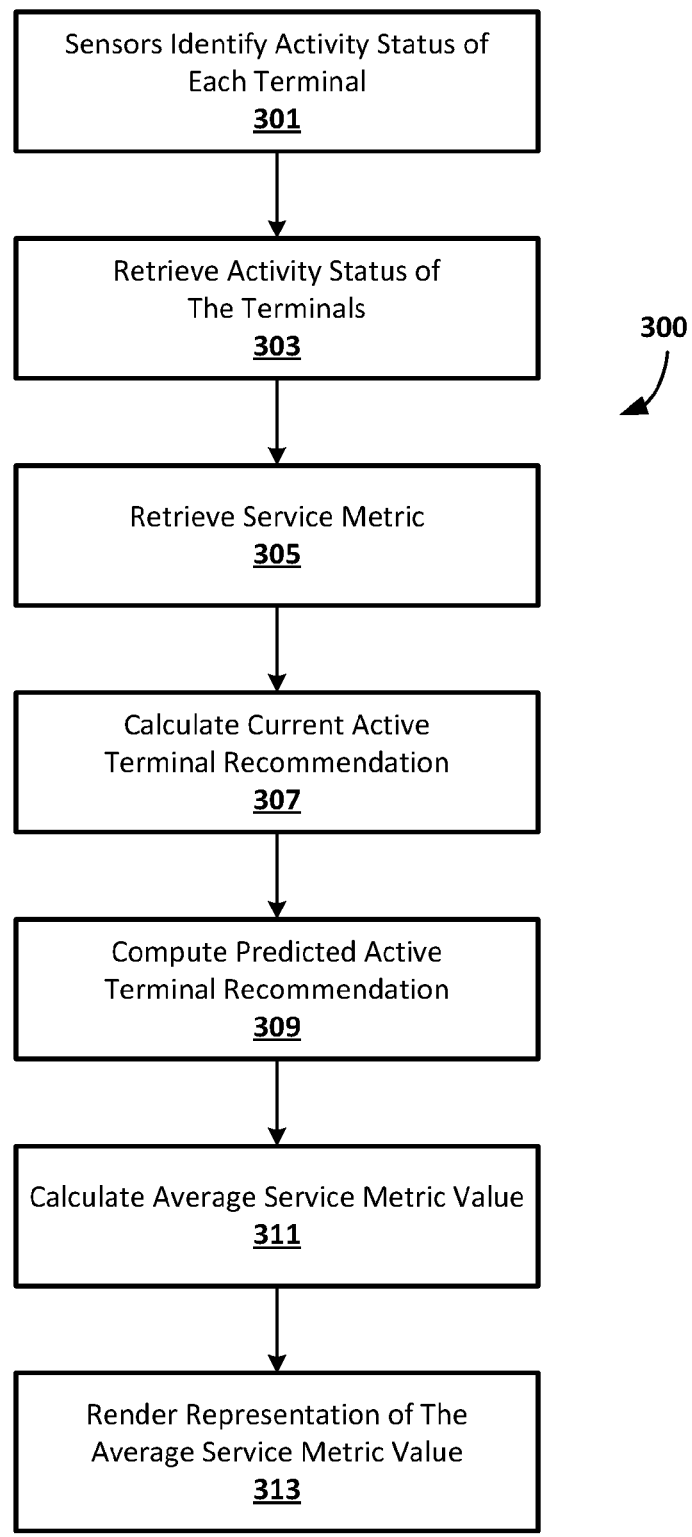
FIG. 3 is a flowchart illustrating another exemplary method for generating terminal resource recommendations, in accordance with an exemplary embodiment of the present disclosure.

FIG. 3 is a flowchart illustrating another method 300 for generating terminal resource recommendations, in accordance with an exemplary embodiment of the present disclosure. It will be appreciated that the method is programmatically performed by one or more computer-executable processes executing on, or in communication with, one or more servers described further below. In step 301, a number of sensors identify an activity status of each of a group of terminals. The sensors can include, for example, cameras, motion detectors, pressure sensors, or other sensors capable of determining the presence and number of persons interacting with each terminal or waiting in a queue to interact, directly or indirectly, with the terminal. In some embodiments, each terminal can be configured to interact with a user and perform a specific task. The ideal number of terminals that should be active may change depending on how many users need access to a terminal at any given time. In some embodiments, the sensors can generate activity status data corresponding to each of the terminals that indicates whether or not each terminal is active. In some embodiments, the sensors can also detect a number of users waiting to interact with each terminal, which can be indicative of the workload corresponding to each terminal. The activity status data can include, for example, the number of currently active terminals, the location of currently active terminals, the number of users in queue to use each currently active terminal, the amount of time each active terminal has been active, the amount of time each idle terminal has been idle, etc.

In step 303, a processor in communication with the sensors executes instructions to retrieve activity status data for each currently active terminals currently active. The number of currently active terminals and associated activity information is used to determine an allocation of current and future terminal resources by embodiments of the present invention.

In step 305, a service metric retrieval module executed by the processor retrieves a service metric representative of a desired workload for each of the currently active terminals. In a non-limiting example, the terminals can include point of sale terminals within an enterprise, and the service metric can correspond to the workload for each point of sale terminal that results in a desired customer experience. For example, the service metric may correspond to a situation where each customer within an enterprise is able to interact with a point of sale terminal without having to wait in line behind more than one other customer. In such an example, if a customer has to wait in line behind two other customers in order to check out at a point of sale terminal, the desired service metric is not satisfied.

In step 307, a terminal recommendation module executed by the processor calculates a current active terminal recommendation. The current active terminal recommendation is representative of the number of terminals that should be currently active in order to satisfy the retrieved service metric. In the example described above in which the terminals are point of sale terminals within an enterprise, and if each of nine terminals are performing according to the retrieved service metric, the current active terminal recommendation would be nine. If, however, two of the active terminals are not meeting the retrieved service metric, and the terminal recommendation module determines that two additional active terminals are needed in order to meet the service metric, the current active terminal recommendation would be eleven.

In step 309, the terminal recommendation module calculates a predicted active terminal recommendation. The predicted active terminal recommendation is based on an amount of customer traffic, and is representative of the number of terminals that should be active at a specified future time period in order to maintain the retrieved service metric at that specified future time period. In some embodiments, the amount of customer traffic can be determined based on data from sensors positioned at an entrance to a facility or within a facility that indicates how many people will need to interact with a terminal in the near future. In a non-limiting example, the terminals can include point of sale terminals within an enterprise, and cameras or motion detectors located at an entrance to the enterprise can detect how many people are currently within the enterprise. In such an example, if a large number of customers is detected entering the enterprise, the terminal recommendation module can predict that a larger number of terminals needs to be active within the next 15-30 minutes in order to maintain the retrieved service metric in response to the increase in customer traffic. In other embodiments, the value of customer traffic can be determined based on historical terminal activity data. For example, if terminal workload typically increases at a particular time each day, the terminal recommendation module can predict that an increased number of terminals needs to be active at that particular time in order to maintain the retrieved service metric.

In step 311, the service metric retrieval module calculates an average service metric value based on an average of the performance of each active terminal with respect to the retrieved service metric. For example, if one terminal is performing below the retrieved service metric, but all of the other active terminals meet or exceed the retrieved service metric, the overall average service metric value may still be at the desired level. In such a scenario, in order to meet the retrieved service level for each active terminal, instead of activating an additional terminal, the persons waiting in line at the underperforming terminal may simply be directed to one of the other active terminals.

In step 313, a display renders a graphical representation of the average service metric value via a GUI. In some embodiments, the graphical representation of the average service metric value can include a color indicative of the overall performance of the currently active terminals. For example, if the average service metric value is above a desired threshold, or if each of the currently active terminals is performing within an acceptable range of the retrieved service metric, the GUI can display a graphical representation of the average service metric value in green. However, if the average service metric value is below a desired threshold, the GUI can display a graphical representation of the average service metric value in red.

Figure 4:
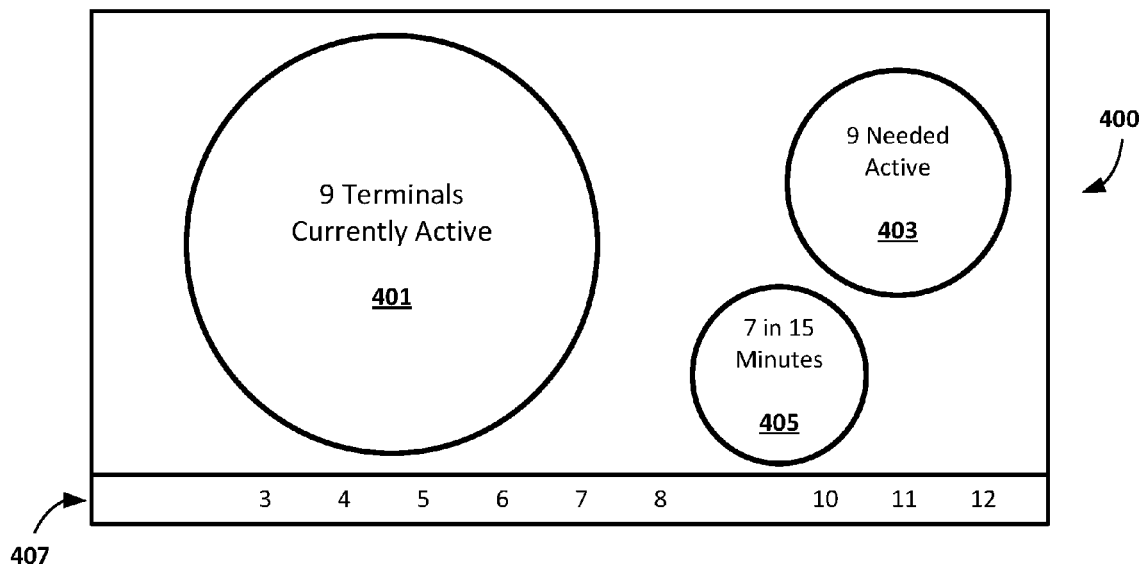
FIG. 4 depicts an exemplary graphical user interface (GUI) for rendering terminal resource recommendations, in accordance with an exemplary embodiment of the present disclosure.

FIG. 4 depicts an exemplary GUI 400 for rendering terminal resource recommendations, in accordance with an exemplary embodiment of the present disclosure. The GUI 400 can be generated by an exemplary electronic device 603. For example, the GUI 400 may be generated on a portable computing device controlled by a store manager. In another example, the GUI 400 may be displayed on a non-portable computing device display to which a store manager has access. In exemplary embodiments, the GUI 400 displays graphical indications representative of the status of the terminals, and provides the user with terminal resource recommendations. For example, the GUI 400 may display a graphical representation 401 of the number of active terminals, a current active terminal recommendation 403 indicating the number of terminals that should be currently active, a predicted active terminal recommendation 405 indicating the number of terminals that should be active at some specified time in the future, and a graphical representation 407 for each individual currently active terminal.

In this example embodiment, the graphical representation 401 of the number of active terminals indicates that nine terminals are currently active, and the graphical representation 407 for each individual currently active terminal indicates that terminals 3-8 and 10-12 are currently active. The current active terminal recommendation 403 indicates that nine terminals are currently needed in order to satisfy the retrieved service metric. If one or more of the terminals were not meeting the retrieved service metric, the current active terminal recommendation 403 could indicate that more than nine terminals were currently needed. The predicted active terminal recommendation 405, in this example embodiment, indicates that in 15 minutes, seven active terminals will be needed in order to maintain the retrieved service metric. This predicted active terminal recommendation 405 can be calculated, for example, based on an expected reduction in terminal users over the next 15 minutes.

Figure 5:
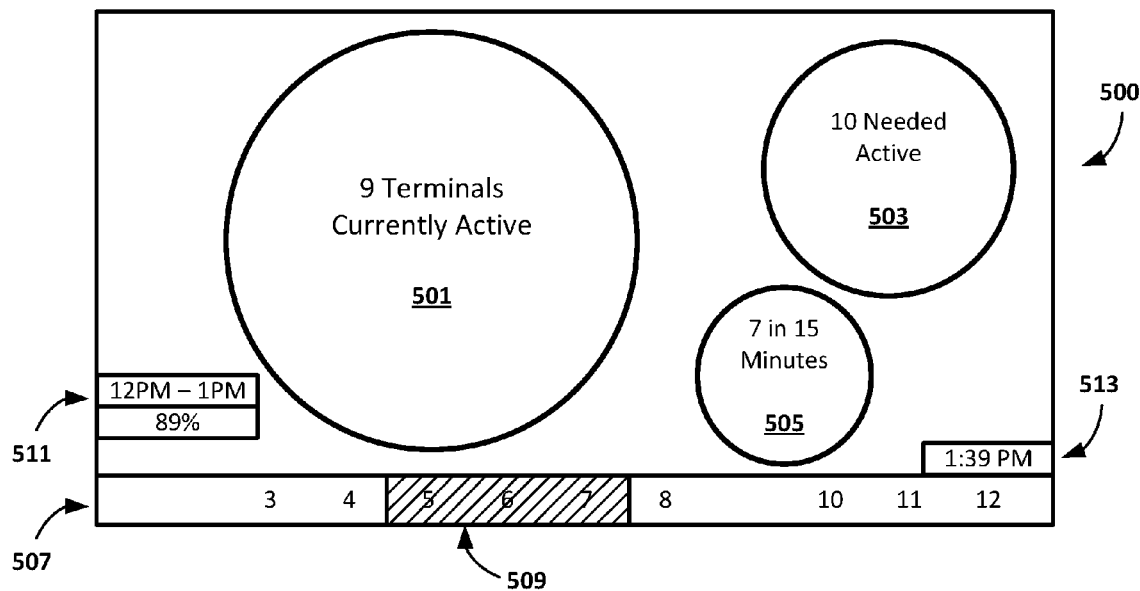
FIG. 5 depicts another exemplary GUI for rendering terminal resource recommendations, in accordance with an exemplary embodiment of the present disclosure.

FIG. 5 depicts another exemplary GUI 500 for rendering terminal resource recommendations, in accordance with an exemplary embodiment of the present disclosure. The GUI 500 can be generated by an exemplary electronic device 603, as discussed in greater detail below. In exemplary embodiments, the GUI 500 displays graphical indications representative of the status of a plurality of terminals, and provides the user with terminal resource recommendations. For example, the GUI 500 may display a graphical representation 501 of the number of active terminals, a current active terminal recommendation 503, a predicted active terminal recommendation 505, and a graphical representation 507 for each individual currently active terminal.

In this exemplary embodiment, the graphical representation 501 of the number of active terminals indicates that nine terminals are currently active, and the graphical representation 507 for each individual currently active terminal indicates that terminals 3-8 and 10-12 are currently active. The GUI 500 is also rendering a graphical indication 509 indicating that terminals 5-7 are not meeting the retrieved service metric. In some embodiments, the graphical indication 509 includes a red coloration over the graphical representations of terminals 5-7. In this example embodiment, because terminals 5-7 are not meeting the retrieved service metric, the current active terminal recommendation 503 indicates that ten terminals are currently needed in order to satisfy the retrieved service metric. The predicted active terminal recommendation 505, in this example embodiment, indicates that in 15 minutes, seven active terminals will be needed in order to maintain the retrieved service metric. This predicted active terminal recommendation 505 can be calculated, for example, based on an expected reduction in terminal users over the next 15 minutes.

The GUI 500 can also display a timestamp 513 indicative of when the current active terminal recommendation 503 and the predicted active terminal recommendation 505 was calculated. The GUI 500 can also display an indication 511 of the percentage of terminal users over a previous time period who received service from one of the active terminals at the desired service level. In this particular example, the indication 511 shows that from 12:00 PM to 1:00 PM, 89% of those who interacted with one of the active terminals received service at the desired service level. In some embodiments, an average service metric value can be calculated based on an average of each active terminal's performance with respect to the retrieved service metric. If the average service metric value is above a desired threshold, or if each of the currently active terminals is performing within an acceptable range of the retrieved service metric, the graphical representation 501 of the number of active terminals can be rendered in green. However, if the average service metric value is below a desired threshold, the graphical representation 501 of the number of active terminals can be rendered in red.

In another embodiment, the GUI 400 may display data related to individual terminal's average service metric values for defined time periods. This information may be useful for instance to determine if a particular employee or particular terminal is the cause of a failure to achieve a service metric rather than a larger facility condition.

Figure 6:
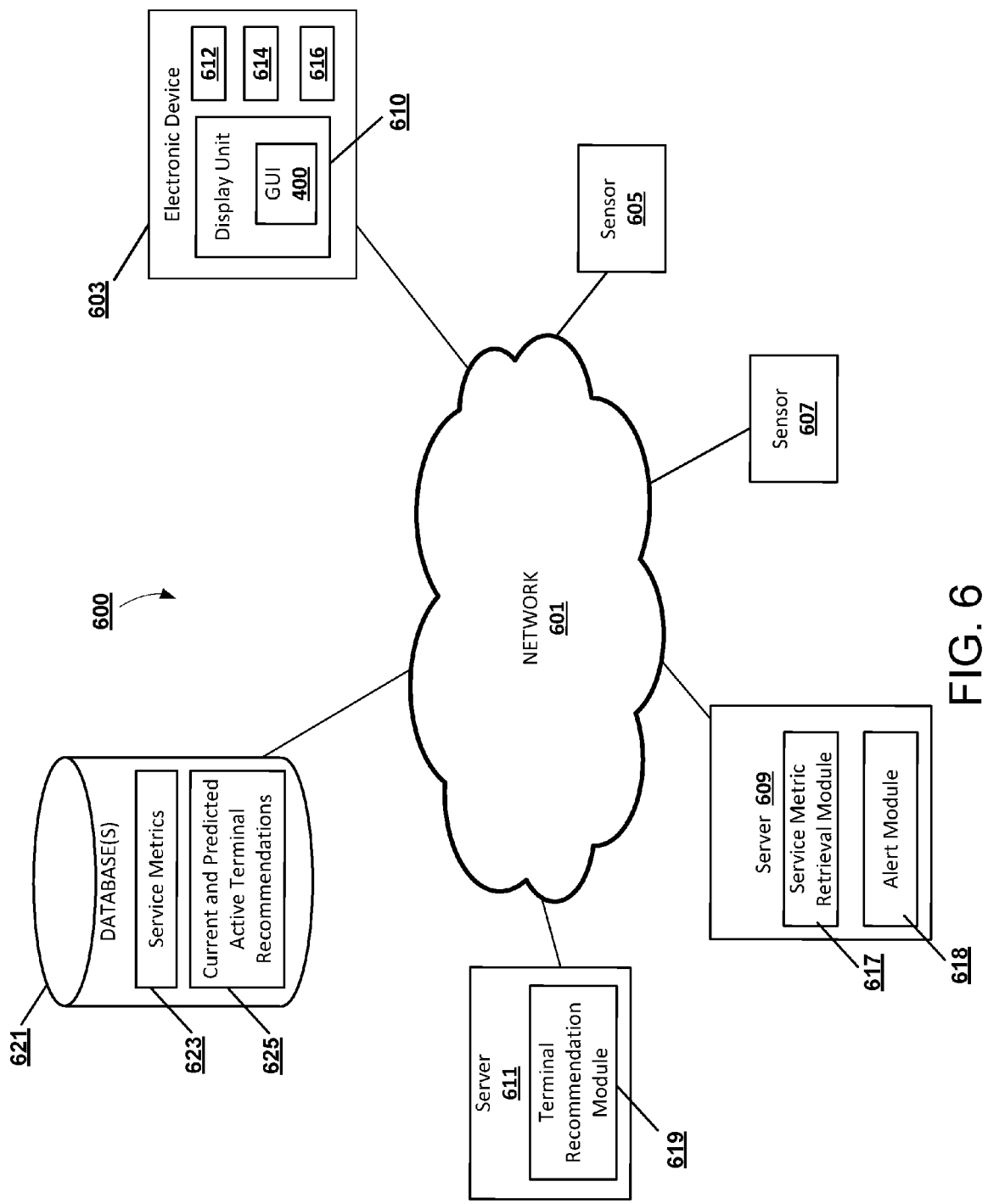
FIG. 6 is a diagram of an exemplary network environment suitable for a distributed implementation of an exemplary embodiment of the present disclosure.

FIG. 6 illustrates a network diagram depicting a system 600 suitable for a distributed implementation of exemplary embodiments. The system 600 can include a network 601, electronic device 603, sensors 605 and 607, servers 609 and 611, and a database 621. As will be appreciated, various distributed or centralized configurations may be implemented. In exemplary embodiments, server 609 can store a service metric retrieval module 617, alert module 618 while server 611 can store a terminal recommendation module 619, each of which can implement one or more of the processes described herein with reference to FIGS. 1-3, or portions thereof. It will be appreciated that the module functionality may be implemented as a greater or lesser number of modules than illustrated, and that the same server could also host multiple modules. The database 621 can store various service metrics 623 and current and predicted active terminal recommendations 625, in exemplary embodiments.

In exemplary embodiments, the electronic device 603 may include a display unit 610, which can display a GUI 400 to a user of the electronic device. The electronic device can also include a memory 612, processor 614, and a wireless interface 616. In some embodiments, the electronic device 603 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, micro-processor-based or programmable consumer electronics, game consoles, set-top boxes, network PCs, mini-computers, smartphones, tablets, netbooks, and the like equipped with, or in communication with, a display surface. The electronic device 603 may include some or all components described in relation to computing device 700 shown in FIG. 7.

The electronic device 603 may connect to network 601 via a wired or wireless connection. The electronic device 603 may include one or more applications such as, but not limited to, a web browser, a sales transaction application, an object reader application, and the like.

In exemplary embodiments, the electronic device 603, sensors 605 and 607, servers 609 and 611, and database 621 may be in communication with each other via the communication network 601. The communication network 601 may include, but is not limited to, the Internet, an intranet, a LAN (Local Area Network), a WAN (Wide Area Network), a MAN (Metropolitan Area Network), a wireless network, an optical network, and the like. In one embodiment, the electronic device 603, sensors 605 and 607, and servers 609 and 611 can transmit instructions to each other over the communication network 601. In exemplary embodiments, the service metrics 623 and current and predicted active terminal recommendations 625 can be stored at database 621 and received at the electronic device 603 or servers 609 and 611 in response to a service performed by a database retrieval application.

Figure 7:
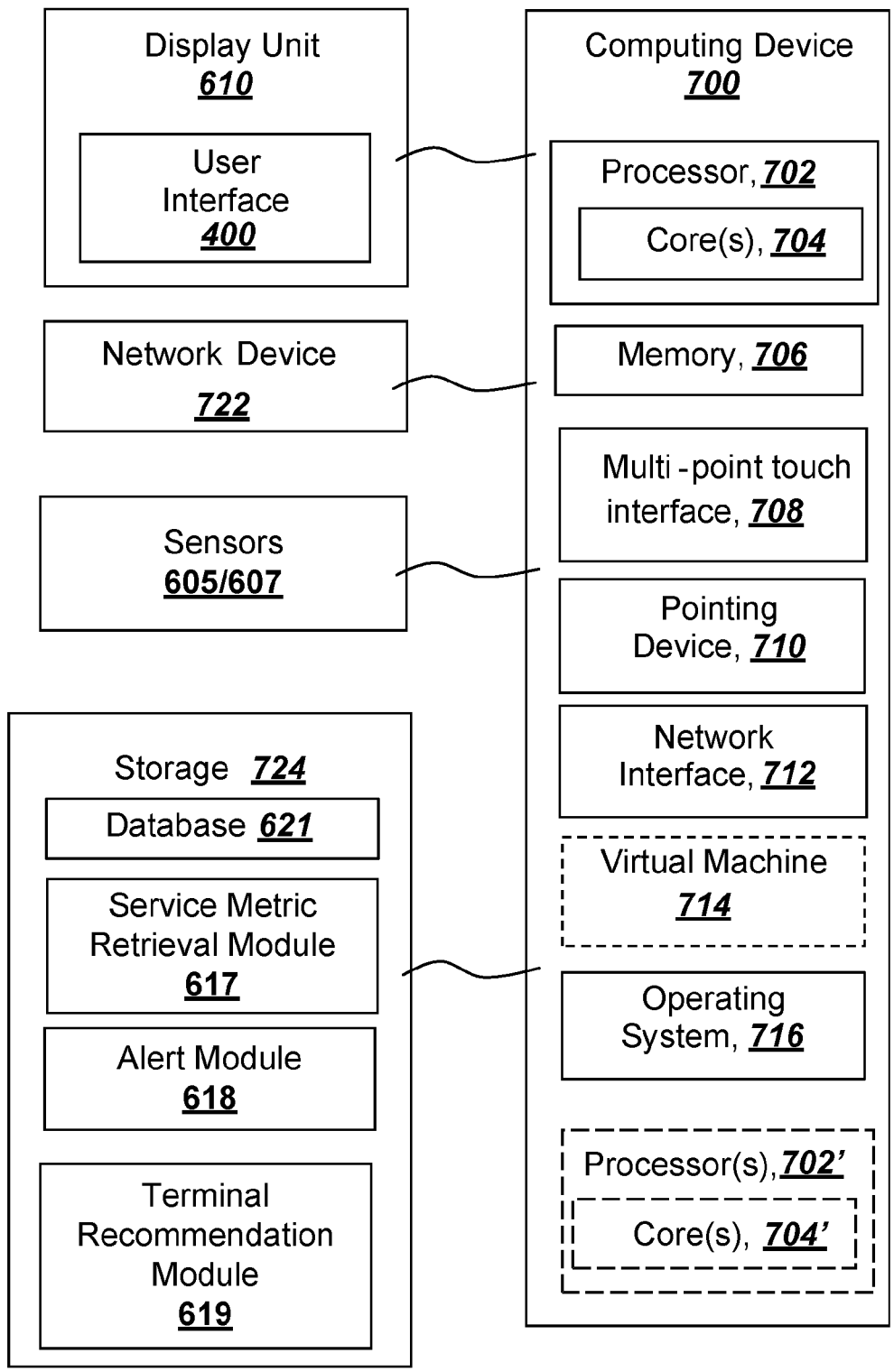
FIG. 7 is a block diagram of an exemplary computing device that can be used to perform exemplary processes in accordance with an exemplary embodiment of the present disclosure.

FIG. 7 is a block diagram of an exemplary computing device 700 that can be used in the performance of any of the example methods according to the principles described herein. The computing device 700 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 706 included in the computing device 700 can store computer-readable and computer-executable instructions or software for implementing exemplary embodiments and programmed to perform processes described above in reference to FIGS. 1-3. The computing device 700 also includes processor 702 and associated core 704, and optionally, one or more additional processor(s) 702' and associated core(s) 704' (for example, in the case of computer systems having multiple processors/cores), for executing computer-readable and computer-executable instructions or software stored in the memory 706 and other programs for controlling system hardware. Processor 702 and processor(s) 702' can each be a single core processor or multiple core (704 and 704') processor.

Virtualization can be employed in the computing device 700 so that infrastructure and resources in the computing device can be shared dynamically. A virtual machine 714 can be provided to handle a process running on multiple processors so that the process appears to be using only one computing resource rather than multiple computing resources. Multiple virtual machines can also be used with one processor.

Memory 706 can be non-transitory computer-readable media including a computer system memory or random access memory, such as DRAM, SRAM, EDO RAM, and the like. Memory 706 can include other types of memory as well, or combinations thereof.

A user can interact with the computing device 700 through a display unit 610, such as a touch screen display or computer monitor, which can display one or more user interfaces 400 that can be provided in accordance with exemplary embodiments described above in reference to FIGS. 4-5. The computing device 700 can also include other I/O devices for receiving input from a user, for example, a keyboard or any suitable multi-point touch interface 708, a pointing device 710 (e.g., a pen, stylus, mouse, or trackpad). The multi-point touch interface 708 and the pointing device 710 can be coupled to the display unit 610. The computing device 700 can include other suitable conventional I/O peripherals.

The computing device 700 can also include one or more storage devices 724, such as a hard-drive, CD-ROM, or other non-transitory computer readable media, for storing data and computer-readable instructions and/or software, such as a service metric retrieval module 617, alert module 618 or a terminal recommendation module 619 that can implement exemplary embodiments of the methods and systems as taught herein, or portions thereof. Exemplary storage device 724 can also store one or more databases 621 for storing any suitable information required to implement exemplary embodiments. The databases can be updated by a user or automatically at any suitable time to add, delete, or update one or more items in the databases. Exemplary storage device 724 can store one or more databases 621 for storing the service metrics 623, the current and predicted active terminal recommendations 625, and any other data/information used to implement exemplary embodiments of the systems and methods described herein. The computing device 700 can also be in communication with one or more sensors 605 and 607 that can identify an activity status of each of a plurality of terminals, as discussed above.

The computing device 700 can include a network interface 712 configured to interface via one or more network devices 722 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 712 can include a built-in network adapter, network interface card, PCMCIA network card, card bus network adapter, wireless network adapter, USB network adapter, modem or any other device suitable for interfacing the computing device 700 to any type of network capable of communication and performing the operations described herein. Moreover, the computing device 700 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 700 can run any operating system 716, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 716 can be run in native mode or emulated mode. In an exemplary embodiment, the operating system 716 can be run on one or more cloud machine instances.

In exemplary embodiments, a demand for terminals can be generated in advance as guidance in order to predict the number of terminals needed at any particular time. This forecast can be generated using historical customer traffic and cashier speed data corresponding to individual stores. When forecasting, customer arrival times can be broken down into 15 minute increments and then total demand per hour can be rounded in order to determine a required number of terminals. For example, an upcoming terminal demand by hour for a Saturday can be projected to correspond to the data shown in Table 2, below.

TABLE 2

| Time | Number of Terminals |
| --- | --- |
| 12:00 AM | 1 |
| 1:00 AM | 2 |
| 2:00 AM | 1 |
| 3:00 AM | 0 |
| 4:00 AM | 1 |
| 5:00 AM | 0 |
| 6:00 AM | 1 |
| 7:00 AM | 3 |
| 8:00 AM | 4 |
| 9:00 AM | 6 |
| 10:00 AM | 8 |
| 11:00 AM | 9 |
| 12:00 PM | 9 |
| 1:00 PM | 10 |
| 2:00 PM | 11 |
| 3:00 PM | 10 |
| 4:00 PM | 9 |
| 5:00 PM | 9 |
| 6:00 PM | 7 |
| 7:00 PM | 9 |
| 8:00 PM | 7 |
| 9:00 PM | 5 |
| 10:00 PM | 3 |
| 11:00 PM | 3 |

In the forecast shown in Table 2, each the number of terminals has been calculated assuming that each item being purchased by a customer takes 4.1 seconds to scan, and each customer needs 67.3 seconds in addition to scanning items to complete checkout. In one exemplary embodiment, the number of customers arriving at staffed terminals can be calculated according to equation (1) below, the service rate can be calculated according to equation (2) below, and an example service level is provided in example (3) below.

$$\text{Total Customer Arrival} - \text{Self-Checkout Arrivals} = \text{Staffed Terminal Arrivals} \quad (1)$$

$$[\text{Service Rate}] = [\text{Ave. Transaction Time}] + ([\text{Ave. Basket Size}] * [\text{Item Scan Speed}]) \quad (2)$$

$$\text{Service Level} = (\text{example}) \; 1 \; \text{customer being served}, 1 \; \text{customer waiting to checkout} \quad (3)$$

In exemplary embodiments, the service rate, service levels, and customer arrival information can be used to calculate the terminal demand forecasts. The algorithms used to calculate the terminal demand forecasts can be run in real time using current dynamic store conditions (i.e., actual arrival rates, actual cashier speeds, actual basket sizes, etc.). For example, if inclement weather causes customer traffic to drop by 50% in the morning between 6:00 AM and 10:00 AM on a Saturday, the terminal demand forecasts can be re-calculated in real time using actual traffic arrival and actual cashier speeds. Thus, the predicted terminal demand can be reduced accordingly as compared to the values in Table 2. In one example embodiment, the dynamic terminal demand recommendations between 6:00 AM and 10:00 AM can be as shown in Table 3, below.

TABLE 3

| Time | Number of Terminals |
| --- | --- |
| 6:00 AM | 1 |
| 7:00 AM | 3 |
| 8:00 AM | 4 |
| 9:00 AM | 6 |
| 10:00 AM | 8 |

Saturday, causing each customer on average to purchase an additional 2 items during that time period, thus increasing average checkout times. An example of dynamically updated terminal demand recommendations for those hours is shown below in Table 4.

TABLE 4

| Time | Number of Terminals |
| --- | --- |
| 2:00 PM | 11 |
| 3:00 PM | 10 |
| 4:00 PM | 9 |
| 5:00 PM | 10 |
| 6:00 PM | 7 |

Exemplary formulas for calculating the terminal resource recommendations described herein can include the following:

```
Function P0(lambda As Double, mu As Double, servers As Double) As Double
    Dim value As Double
    Dim Inc As Double
    value = 0
    For Inc = 0 To servers - 1
        value = value + ((lambda / mu) ^ Inc) / FACT(Inc)
    Next Inc
    P0 = (value + (((lambda / mu) ^ servers) / (FACT(servers) * (1 - (lambda / mu) / servers)))) ^ -1
End Function
Function RHO(lambda As Double, mu As Double, servers As Double) As Double
    RHO = (lambda / mu) / servers
End Function
Function LQ(lambda As Double, mu As Double, servers As Double) As Double
    On Error Resume Next
    LQ = ((((lambda / mu)) ^ (servers + 1)) / ((FACT(servers - 1)) * (servers - (lambda / mu)) ^ 2)) * P0(lambda, mu, servers)
End Function
Function WQ(lambda As Double, mu As Double, servers As Double) As Double
    WQ = LQ(lambda, mu, servers) / lambda
End Function
Function L(lambda As Double, mu As Double, servers As Double) As Double
    L = LQ(lambda, mu, servers) + lambda / mu
End Function
Function W(lambda As Double, mu As Double, servers As Double) As Double
    W = L(lambda, mu, servers) / lambda
End Function
Function SVR(lambda As Double, mu As Double, wt As Double) As Double
    Dim servers As Double
    servers = 1
    Do While WQ(lambda, mu, servers) * 15 > wt Or WQ(lambda, mu, servers) * 15 < 0
        servers = servers + 1
    Loop
    SVR = servers
End Function
Function FACT(x As Double) As Double
    Dim value As Double
    Dim Inc As Integer
    value = x
    If value = 0 Then
        FACT = 1
        Exit Function
    End If
    For Inc = x - 1 To 1 Step -1
        value = value * Inc
    Next Inc
    FACT = value
End Function
```

In another exemplary embodiment, a promotion can be added in the afternoon between 2:00 PM and 6:00 PM on a In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for generating terminal resource recommendations, the system comprising:
    a plurality of sensors configured to acquire data that identifies a number of waiting customers at each of a plurality of point of sale terminals in a facility; and
    a processor in communication with the plurality of sensors and configured to retrieve the acquired data identifying the number of waiting customers at each of the plurality of point of sale terminals in the facility, wherein the processor is further configured to execute:
        a service metric retrieval module that when executed retrieves a service metric representative of a desired workload for each of the point of sale terminals currently active, the workload identified based on the number of customers waiting at each point of sale terminal; and
        a terminal recommendation module that when executed:
            calculates a current active terminal recommendation representative of a number of terminals of the plurality of point of sale terminals that should be currently active in order to satisfy the retrieved service metric; and
            calculates a predicted active terminal recommendation, based on an amount of customer traffic, representative of a number of terminals of the plurality of point of sale terminals that should be active at a specified future time period in order to maintain the retrieved service metric at the specified future time period.

2. The system of claim 1, further comprising a display configured to render a graphical representation of each currently active point of sale terminal.

3. The system of claim 2, wherein the display is further configured to render a timestamp indicative of when the current active terminal recommendation was calculated.

4. The system of claim 2, wherein the service metric retrieval module is further configured to calculate an average service metric value based on an average of each active point of sale terminal's performance with respect to the retrieved service metric.

5. The system of claim 4, wherein the display is further configured to render a graphical representation of the average service metric value.

6. The system of claim 2, wherein the graphical representation of each currently active terminal includes a visual indication of whether that point of sale terminal is satisfying the retrieved service metric.

7. The system of claim 6, wherein the visual indication is a color.

8. A computing device-implemented method for generating terminal resource recommendations, the computing device including one or more processors, the method comprising:
    acquiring data, using a plurality of sensors, that identifies a number of waiting customers at each of a plurality of point of sale terminals in a facility;
    retrieving the acquired data identifying the number of waiting customers at each of the plurality of point of sale terminals in the facility;
    retrieving, via a service metric retrieval module, a service metric representative of a desired workload for each of the point of sale terminals currently active, the workload identified based on the number of customers waiting at each terminal;
    calculating, via a terminal recommendation module, a current active terminal recommendation representative of a number of terminals of the plurality of point of sale terminals that should be currently active in order to satisfy the retrieved service metric; and
    calculating, via a terminal recommendation module, a predicted active terminal recommendation, based on an amount of customer traffic, representative of a number of terminals of the plurality of point of sale terminals that should be active at a specified future time period in order to maintain the retrieved service metric at the specified future time period.

9. The method of claim 8, further comprising rendering, via a display device, a graphical representation of each currently active terminal.

10. The method of claim 9, further comprising rendering, via the display device, a timestamp indicative of when the current active terminal recommendation was calculated.

11. The method of claim 9, further comprising calculating, via the service metric retrieval module, an average service metric value based on an average of each active terminal's performance with respect to the retrieved service metric.

12. The method of claim 11, further comprising rendering, via the display device, a graphical representation of the average service metric value.

13. The method of claim 9, wherein the graphical representation of each currently active terminal includes a visual indication of whether that point of sale terminal is satisfying the retrieved service metric.

14. The method of claim 13, wherein the visual indication is a color.

15. A non-transitory machine readable medium storing instructions executable by a processing device, wherein execution of the instructions causes the processing device to implement a method for generating terminal resource recommendations, the method comprising:
    acquiring data, using a plurality of sensors, that identifies a number of waiting customers at each of a plurality of point of sale terminals in a facility;
    retrieving the acquired data identifying the number of waiting customers at each of the plurality of point of sale terminals in the facility;

retrieving, via a service metric retrieval module, a service metric representative of a desired workload for each of the point of sale terminals currently active, the workload identified based on the number of customers waiting at each terminal;

calculating, via a terminal recommendation module, a current active terminal recommendation representative of a number of terminals of the plurality of point of sale terminals that should be currently active in order to satisfy the retrieved service metric; and calculating, via a terminal recommendation module, a predicted active terminal recommendation, based on an amount of customer traffic, representative of a number of terminals of the plurality of point of sale terminals that should be active at a specified future time period in order to maintain the retrieved service metric at the specified future time period.

16. The non-transitory machine readable medium of claim 15, wherein execution of the instructions further causes the processing device to render, via a display device, a graphical representation of each currently active terminal.

17. The non-transitory machine readable medium of claim 16, wherein execution of the instructions further causes the processing device to render, via the display device, a timestamp indicative of when the current active terminal recommendation was calculated.

18. The non-transitory machine readable medium of claim 16, wherein execution of the instructions further causes the processing device to calculate, via the service metric retrieval module, an average service metric value based on an average of each active terminal's performance with respect to the retrieved service metric.

19. The non-transitory machine readable medium of claim 18, wherein execution of the instructions further causes the processing device to render, via the display device, a graphical representation of the average service metric value.

20. The non-transitory machine readable medium of claim 16, wherein the graphical representation of each currently active terminal includes a visual indication of whether that point of sale terminal is satisfying the retrieved service metric.

* * * * *